(12) United States Patent
Mazumder et al.

(10) Patent No.: US 8,842,948 B2
(45) Date of Patent: Sep. 23, 2014

(54) DYNAMIC TERAHERTZ SWITCHING DEVICE COMPRISING SUB-WAVELENGTH CORRUGATED WAVEGUIDES AND CAVITY THAT UTILIZES RESONANCE AND ABSORPTION FOR ATTAINING ON AND OFF STATES

(75) Inventors: Pinaki Mazumder, Ann Arbor, MI (US); Kyungju Song, Ann Arbor, MI (US)

(73) Assignee: Pinaki Mazumder, Ann Arbor, MI (US)

( * ) Notice: Subject to any disclaimer, the term of this patent is extended or adjusted under 35 U.S.C. 154(b) by 242 days.

(21) Appl. No.: 13/466,702

(22) Filed: May 8, 2012

(65) Prior Publication Data

US 2013/0301983 A1    Nov. 14, 2013

(51) Int. Cl.

| | |
|---|---|
| *G02B 6/34* | (2006.01) |
| *G02B 6/35* | (2006.01) |
| *G02B 6/122* | (2006.01) |
| *G02B 6/293* | (2006.01) |
| G02B 6/26 | (2006.01) |
| G02B 6/42 | (2006.01) |

(52) U.S. Cl.
CPC .............. *G02B 6/35* (2013.01); *G02B 6/1226* (2013.01); *G02B 6/29322* (2013.01)
USPC .............................................. 385/16; 385/37

(58) Field of Classification Search
CPC ........ G02B 6/1226; G02B 6/107; G02B 6/35; G02B 5/008; G02F 2203/10; G02F 2203/13; G02F 1/365; H01S 5/1046
See application file for complete search history.

(56) References Cited

U.S. PATENT DOCUMENTS

| | | | | |
|---|---|---|---|---|
| 8,208,191 | B2* | 6/2012 | Gan et al. ...................... | 359/288 |
| 8,503,839 | B2* | 8/2013 | Cheben et al. .................. | 385/31 |
| 2010/0110525 | A1* | 5/2010 | Gan et al. ...................... | 359/288 |
| 2012/0019901 | A1* | 1/2012 | Mazumder ..................... | 359/320 |
| 2013/0301983 | A1* | 11/2013 | Mazumder et al. ............. | 385/16 |

OTHER PUBLICATIONS

N. Yu, et. al., "Terahertz plasmonics," Electronic Letters, p. S52-S57, Dec. 2010.*

Z. Xu, et. al "Analysis of Doubly Corrugated Spoof Surface Plasmon Polariton (DC-SSPP) Structure With Sub-Wavelength Transmission at THz Frequencies," IEEE Transactions on Terahertz Science and Technology, vol. 2, pp. 345-354, May 2012.*

(Continued)

*Primary Examiner* — Rhonda Peace (57) ABSTRACT

A terahertz (THz) switch consisting of perfect conductor metamaterials is discussed in this invention. Specifically, we have built a THz logic block by combining two double-sided corrugated waveguides capable of slowing down the electromagnetic waves in the THz regime with a sub-wavelength cavity, having one or more grooves with shorter height than the grooves of the periodic corrugated waveguide. This new type of THz structure is called as the waveguide-cavity-waveguide (WCW). The new invention is based on our mathematical modeling and experimentation that confirms a strong electromagnetic field accumulation inside the tiny cavity which can confine EM field for a long time within a very small effective volume ($V_{eff}$) to provide high quality (Q) factor. Therefore, an efficient THz switch can be designed to achieve ON-OFF switching functionality by modulating the refractive index n or extinction coefficient α inside the switching junction. The dimensions of the periodic structure and cavity can be optimized to apply the invention to slow-EM wave devices working at other frequencies in the EM spectrum including the microwave and outside the THz domain which is generally accepted as from 0.3 THz to 3 THz.

10 Claims, 13 Drawing Sheets

(56) References Cited

OTHER PUBLICATIONS

K. Song, et. al., "Active Terahertz Spoof Surface Plasmon Polariton Switch Comprising the Perfect Conductor Metamaterial," IEEE Transactions on Electron Devices, vol. 56, pp. 2792-2799, Nov. 2009.*

K. Song, et. al., "Active Terz Hertz (THz) Spoof Surface Plasmon Polariton (SSPP) Switch Comprising the Perfect Meta-Material," 9th IEEE Conference on Nanotechnology, pp. 98-101, 2009.*

K. Song, et. al., "Spoof Surface Plasmon Polariton Switches for GHz-THz System," 2011 11th IEEE International Conference on Nanotechnology, pp. 1420-1423, 2011.*

* cited by examiner

DYNAMIC TERAHERTZ SWITCHING DEVICE COMPRISING SUB-WAVELENGTH CORRUGATED WAVEGUIDES AND CAVITY THAT UTILIZES RESONANCE AND ABSORPTION FOR ATTAINING ON AND OFF STATES

GOVERNMENT RIGHTS

The Government has certain rights in the invention since the invention was partially made with Government support under the Air Force Scientific Research Office grant number FA 9950-06-1-0493

FIELD OF THE INVENTION

The invention relates to the field of THz technology, metamaterial, plasmonics and slow EM wave device, and in particular dynamic THz switching using resonance and absorption.

BACKGROUND OF THE INVENTION

There is need in building optimal architectures to perform THz switching inside the small cavity. We want to minimize switching power, signal loss, response time while ensuring high on/off extinction ratio and low energy to control the switch.

Slow EM wave at THz speed supported by a highly conducting surface resembles surface plasmon polariton (SSP) modes and, henceforth, is called pseudo or spoof surface plasmon polariton (SSPP) modes.

The promising capability of SSPP modes is the miniaturization of THz elements and devices on a sub-wavelength scale, thus leading to the development of compact, ultrafast, and low power digital RF-THz circuits.

Design flexibility of metallic structures provides a promising way toward controlling or steering THz signal in future communication and digital circuits. Sub-wavelength metallic gap structures with a periodic array of grooves to increase slow down factor $S=v_c/v_g$, defined as the phase velocity over the group velocity, and use pass-band and stop-band characteristics similar to photonic crystals.

Basic architectures of the invention comprises a THz logic block by combining two double-sided corrugated waveguides with a sub-wavelength cavity, having one or more grooves with shorter height than the periodic waveguide grooves. This new THz structure is called the waveguide-cavity-waveguide (WCW) structure. Specifically, small cavity enables us to confine the EM wave for a long time in a very small volume. Therefore, the arbitrarily designed cavity with high quality factor (Q) and small effective volume ($V_{eff}$) can be utilized for efficient switches.

The switching junction designed by high quality factor Q and small effective volume $V_{eff}$ enables us to obtain efficient THz switching functionality by achieving small refractive index modulation δn/n.

In addition, THz switching can also be obtained by using the loss induced modulation δα.

SUMMARY OF THE INVENTION

The main purpose of the invention is to provide a dynamic THz switch by utilizing SSPP modes which are known as slow EM wave modes.

Next purpose of the invention is to build dynamically controlled switching block consisting of the waveguide-cavity-waveguide to ensure efficient switching that requires low energy control signal. Without the proposed WCW structure, double-sided corrugated structures can be used with LCD or anisotropic dielectric medium to build slow EM switch, but the control energy that will be needed to achieve 10 dB extinction ratio is prohibitively large as well as the electro-optic control signal needs to be applied to the entire length of the dielectric waveguide to ensure that the LCD is polarized uniformly along the length of signal propagation.

DETAILED DESCRIPTION OF THE INVENTION

Spoof Surface Plasmon Polariton (SSPP) Dispersion Modes

There exists significant interest in developing sub-wavelength THz pulse propagation through the use of grooves, holes and dimples created on the surface of metallic structures.

Figure 1:
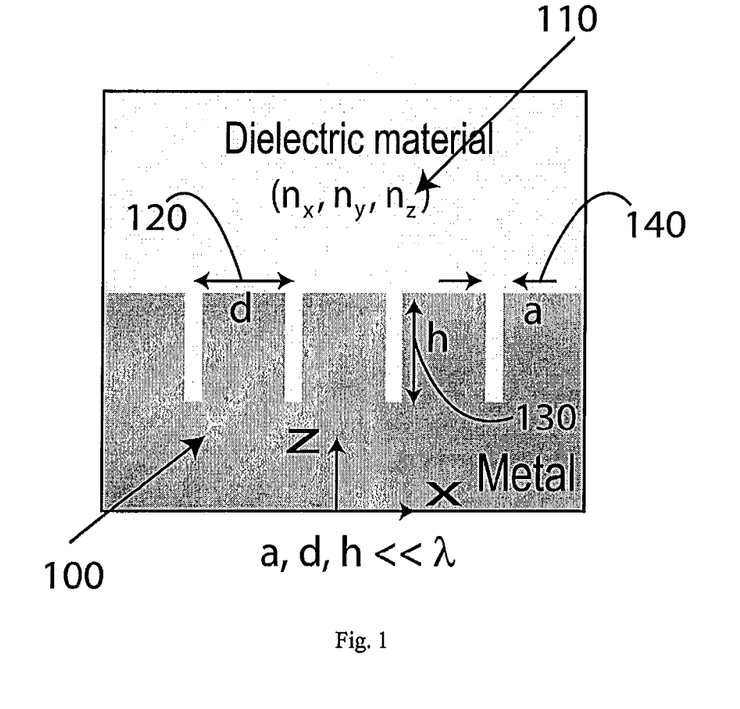
FIG. 1 is a schematic diagram of a 1-D metallic groove array.

FIG. 1 shows a schematic diagram of the one-dimensional (1-D) grooves array 100 with geometrical parameters periodic distance d 120, groove width a 140, groove height h 130 and dielectric refractive index ($n_x$, $n_y$, $n_z$) 110. In particular, geometrical parameters d 120, a 140, h 130 have sub-wavelength geometrical parameters (d 120, h 130, a 140<<λ, wavelength of operational frequency).

Figure 2:
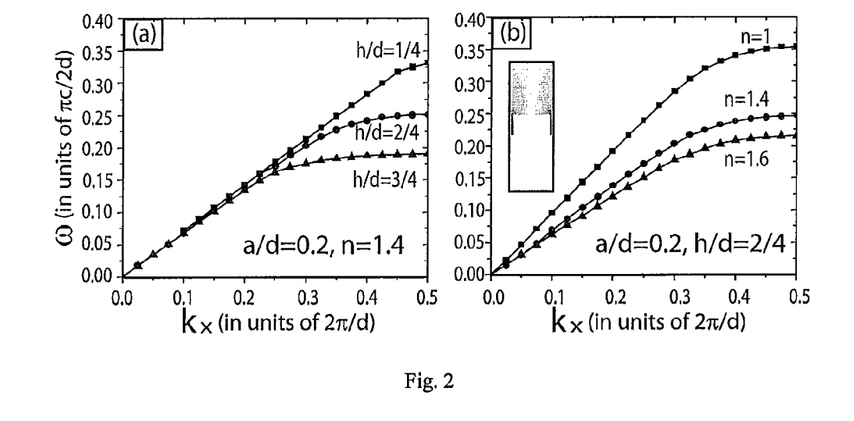
FIG. 2(a) shows TM dispersion relationship for SSPP modes calculated by changing height h. The structure is supported by a 1-D array of grooves with a/d=0.2 and n=1.4.
FIG. 2(b) shows TM dispersion relationships for SSPP modes calculated by varying the refractive index n. The structure is supported by a 1-D array of grooves with a/d=0.2 and h/d=2/4.

The transverse magnetic SSPP modes can be easily modulated by varying the height h 130 as shown in FIG. 2(a), thus providing efficient THz passive elements such as guiding structures, focusing elements and filters. In addition, the dynamic control of SSPP modes can be achieved by altering the refractive index n 110 as illustrated in FIG. 2(b), thereby yielding the feasibility of dynamic THz elements such as switches, modulators and multiplexers.

Basic Physics of THz Switch Based on Waveguide-Cavity-Waveguide (WCW) Structure

Figure 3:
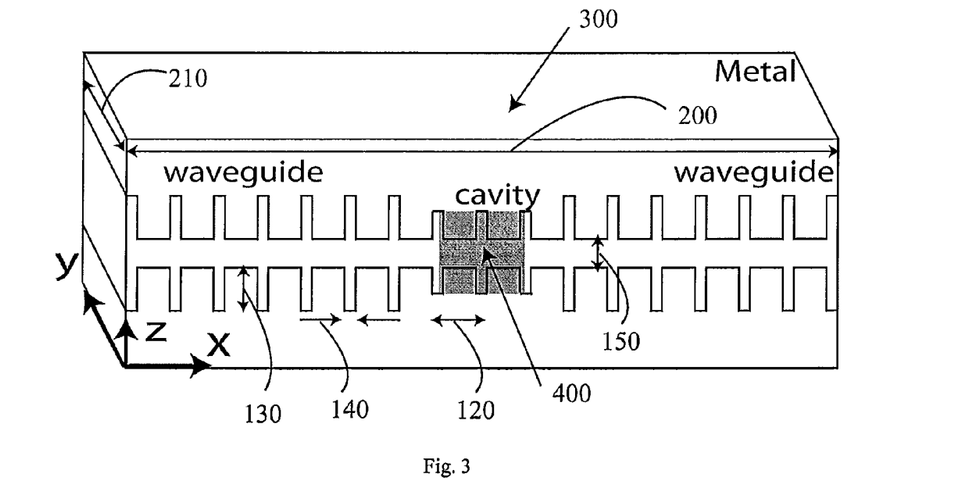
FIG. 3 illustrates a THz waveguide-cavity-waveguide with a 1-D periodicity.
Figure 4:
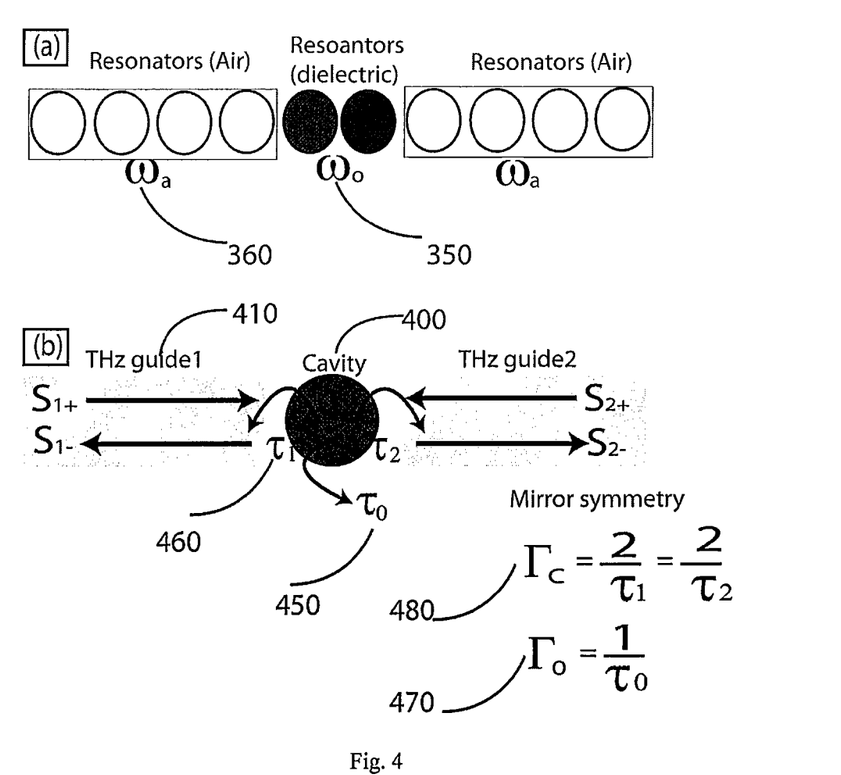
FIG. 4(a) shows that The THz waveguide can be regarded as a large resonator array with free space (n=1), and the cavity can be considered as a small resonator array with different height (h) and refractive index (n).
FIG. 4(b) shows a schematic diagram illustrating the essential physics used in the THz filters and switches.

We focus on the waveguide-cavity-waveguide structure 300 for THz filters or switches as shown in FIG. 3. The grooves of the waveguides 410 are shown to be of constant height in FIG. 3, but they can be of varying heights 130. Similarly, grooves of the cavity 400 are also shown in FIG. 3 as the same height 130, albeit lower than the height of grooves for the waveguides 410. However, cavity 400 can be designed without any grooves and may consist of dielectrics of variable refractive indexes 110. As shown in FIG. 4(a), THz waveguides 410 can be considered as equispaced resonators arrays, thus providing the maximum transmittance at a specific frequency ($\omega_a$) 360 behaving like THz filters and yielding slow EM wave propagation. In addition, the small resonators array with different height (h) 130 and refractive index (n) 110 can be regarded as a cavity 400 with the resonant frequency ($\omega_o$) 350. Furthermore, there are three main physical mechanisms to determine ON-OFF switching functionality by tuning the resonant frequency ($\omega_0$) 350, waveguide-cavity coupling rate ($\Gamma_c$) 480 and intrinsic cavity decay rate ($\Gamma_o$) 470.

Design of the THz SSPP Waveguide

First, we consider the SSPP dispersion of THz waveguides 410 consisting of two sandwiched SSPP gap structures with geometrical parameters of a/d=0.1, h1/d=0.8, t/d=1/3, d=100 µm, and n=1 as shown in FIG. 3. The specific frequency $\omega_a$ is determined by the periodic distance d 120, height of periodic structure h1 130, thickness of metallic gap structure t 150, and groove width, a 140. We use air waveguides of n=1 rather than dielectric waveguides of n>1 to eliminate inherent loss inside the THz waveguides 410.

Figure 5:
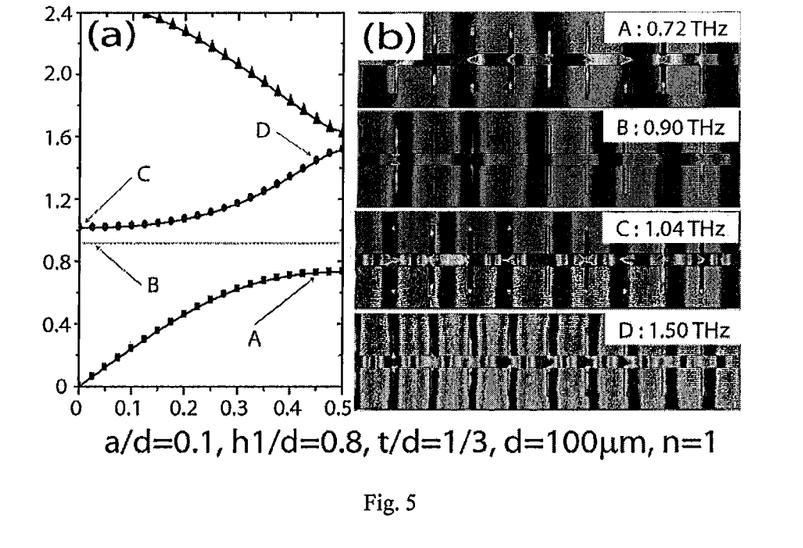
FIG. 5(a) shows that TM dispersion curves of SSPP modes supported by the sandwiched metamaterial conductor with geometrical parameters of d=100 μm, a=10 μm, h=80 μm, t=100/3 μm, and n=1.
FIG. 5(b) shows the finite element simulation (FEM): spatial distributions of the E-field across the THz waveguides for four different frequencies of 0.72, 0.90, 1.04 and 1.50 THz, respectively. To explain theoretical concept, we conducted an FEM simulation based on 3-D architecture with open sides (width=500 μm: y-direction). Because of large width, there are negligible differences between 3-D and 2-D simulation.

The SSPP dispersion curves of these structures show multiple SSPP confined modes, thus providing photonic band-gap management as shown in FIG. 5(a). In addition, we conduct an FEM simulation as shown in FIG. 5(b) to verify the THz signal propagation along the corrugated sandwiched metamaterial structure. For instance, the frequency lies in the vicinity of the first band edge at 0.72 THz, thus generating a relatively strong SSPP confinement. However, at 0.90 THz, the frequency is located at the photonic band gap region, thus prohibiting THz signal propagation. As we increase at 1.04 THz, the THz signals are strongly localized at the grooves within the sandwiched structure, thus realizing slow EM wave propagation along the periodic gap structure. If we increase the frequency up to 1.50 THz, the THz signals provide small localization, as shown in FIG. 5(b). Therefore, the operation frequency of our device is 1.04 THz with λ of ~288 µm. At the given frequency, the THz design parameters have metamaterial conditions of a 140=~λ/30 and t 150=~λ/9 in contrast to conventional metallic grating waveguides.

Design of the THz SSPP Cavity

Next, we introduce a linear localization with grating period N=2 into background THz filters by reducing the height 130 of the THz structure as illustrated in FIG. 3. Since transmission spectrum of THz waveguides 410 has a sharp peak which means the specific frequency $\omega_a$ 360 precisely located at $\omega_a \sim 1.38\pi c/2d$. To obtain an efficient signal processing along THz lines, it is essential to coincide with both the resonant frequency $\omega_o$ 350 of the cavity 400 and the resonant frequency $\omega_a$ 360 of THz waveguides 410 as provided FIG. 4(a).

The resonant frequency of SSPP gap structures can be designed by two fundamental parameters: (1) height h 130 of corrugated metallic structures and (2) refractive index n 110. Furthermore, the resonant frequency of SSPP modes is inversely proportional to the height of the corrugated structure h 130 and refractive index n 110, thereby the height 130 of the cavity structure 400 with the dielectric material (n>1) should be small compared to those of THz waveguides 410. By decreasing the height 130 of corrugated structure and increasing refractive index 110, we can find an efficient narrow band filter based on the THz waveguide-cavity-waveguide 300. For example, we obtain SSPP dispersion relations with heights h 130 and refractive indices n 110 by assuming that EM fields satisfy boundary conditions.

Figure 6:
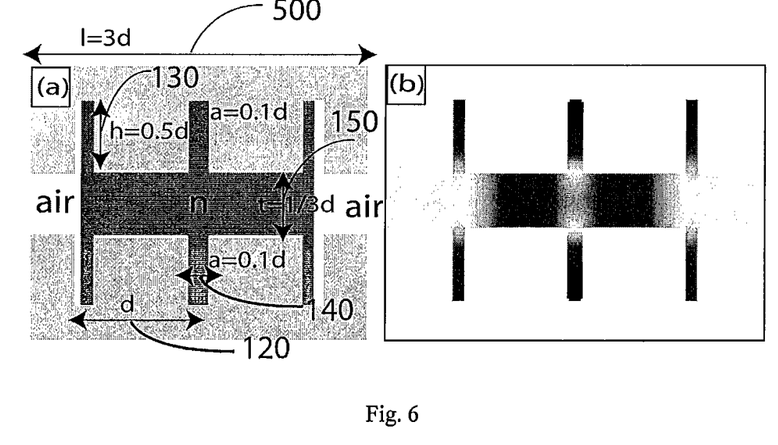
FIG. 6(a) shows the schematic of the THz SSPP cavity.
FIG. 6(b) shows the mode profile for the THz cavity at the resonant frequency ($\omega_o \sim 1.38\pi c/2d$).

We simulate the cavity structure 400 with geometrical parameters (l=3d, a/d=0.1, t/d=1/3, h/d=0.5 and n=1.414) to estimate the quality factor Q and resonant frequency $\omega_o$ 350 as shown in FIG. 6 (a). In this condition, we obtain the resonant frequency $\omega_o$ 350~1.38πc/2d with Q~690 as shown in FIG. 6 (b).

THz Switching Based on Resonance

We have designed a narrow SSPP band-pass filter with a waveguide-cavity-waveguide structure. Next, we will consider how this structure 300 can be extended to dynamic THz switches. In principle, as n increases, $\omega_o$ 350 shifts to a lower frequency. In contrast, as n decreases, $\omega_o$ 350 moves to a higher frequency. From the temporal coupled wave analysis, we obtain intuitive understanding of SSPP switching based on the refractive index modulation of the localized cavity 400. Let us assume that intrinsic cavity decay rate $\Gamma_o$ 470 is neg ligible, so that $\Gamma_o$ 470→0. Then, transmission and reflection can be described:

$$T(\omega) = \frac{(\Gamma_c)^2}{(\omega - \omega_0)^2 + (\Gamma_c)^2} \text{ and } R(\omega) = \frac{(\omega - \omega_0)^2}{(\omega - \omega_0)^2 + (\Gamma_c)^2} \quad (1)$$

In specific, Eqn. (1) lead to two fundamental limiting switching conditions. In one cases, $|\omega-\omega_o|=\Delta\omega_o \ll \Gamma_c$, i.e., the frequency of THz guided mode is almost equal to the resonant frequency 350 of cavity 400. Eqn. (1) describes that almost power from THz waveguide 1 can be transferred to the THz waveguide 2, thus demonstrating ON switching condition. In the opposite case, $|\omega-\omega_o|=\Delta\omega_o \gg \Gamma_c$, i.e., the frequency of SSPP mode has a large shift from the resonant frequency of cavity 400. From Eqn. (1), the reflection spectrum almost approaches unity, while the transmission spectrum goes zero, thus verifying OFF state.

Figure 7:
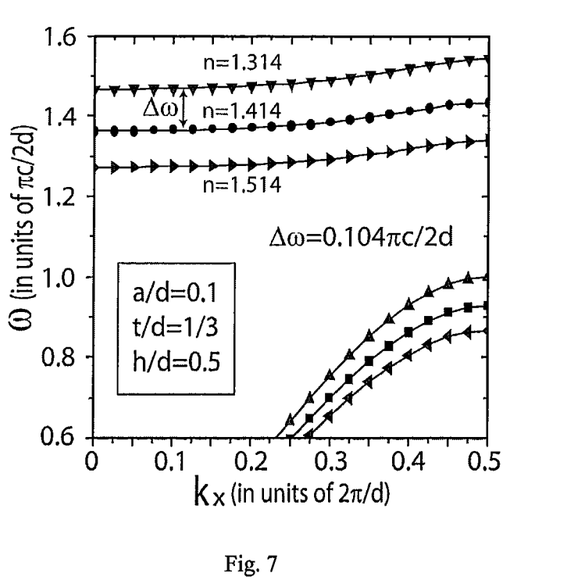
FIG. 7 illustrates SSPP dispersion diagrams supported by sandwiched perfect conductor metamaterials with geometrical parameters a/d=0.1, t/d=1/3 and h/d=0.5 for three different refractive indices n=1.314, 1.414 and 1.514, respectively.

Until now, we have considered the qualitative analysis based on the temporal coupled wave analysis, we now focus on the realistic SSPP THz switch based on the resonant modulation. To obtain the efficient THz switch, we show the SSPP dispersion analysis comprising geometrical configurations: a/d=0.1, t/d=1/3 and h/d=0.5 for three different refractive indices 110: (n=1.314), (n=1.414) and (n=1.514). As can be seen in FIG. 7, if we increases the refractive index change δn=0.1, thus lowering the resonant frequency $\Delta\omega_o$~0.104πc/2d.

Next, waveguide-cavity coupling rate $\Gamma_c$ 480 can be given by:

$$\Gamma_c \sim \frac{\omega_o}{2Q} = \frac{(1-R)v_g}{L_{cav}} \quad (2)$$

FDTD simulation yields Q~690 in the cavity structure 400 with the length of $L_{cav}$=2d, thus approximately providing $\Gamma_c$ 480=0.001015πc/2d. Thus, $\Gamma_c \ll \Delta\omega_o$ at δn/n=0.01 from FDTD, switching function can be realized by modulating the refractive index modulation.

Figure 8:
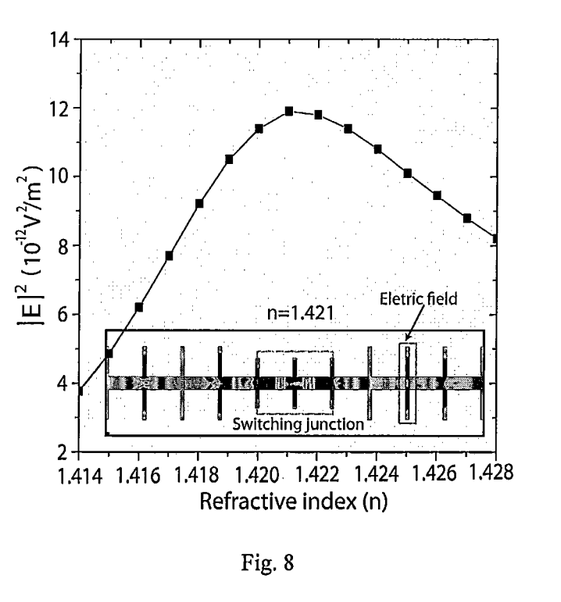
FIG. 8 shows the magnitude of E-field of f=1.04 THz in the metallic groove volume located at 800 μm corresponding to the refractive index modulation inside the switching junction. THz waveguides have same geometrical parameters as illustrated in FIG. 4. In addition, the cavity has geometrical parameters: d=100 μm, a=10 μm, h=50 μm and t=100/3 μm=33.33 μm. The inset of FIG. 10 illustrates spatial snapshot of E-field distribution of the corrugated periodic perfect conductor metamaterial.

To confirm THz switching using the refractive index modulation, we conduct HFSS simulation based on the finite element method (FEM). The inset of FIG. 8 shows the spatial snapshot of E-field at n=1.421 (at cavity resonant condition). The small difference of resonant frequencies between FDTD and FEM originate from numerical noise. FIG. 8 shows the magnitude of E-field in the metallic grooves located at 800 µm corresponding to the refractive index modulation. The magnitude is calculated by integrating $|E|^2$ inside a gap volume. As can be seen, the resonant mode of the cavity 400 (n=1.421) allows us to achieve almost 100% transmission which means the ON state. In addition, the 3-dB extinction ratio $r_e$=10 log($P_{ON}/P_{OFF}$) at the output port can be obtained by the refractive index modulation at δn/n~0.004.

However, it is essential to consider optimal design perspective to build efficient THz switching systems constrained by two fundamental cavity parameters: quality factor (Q), being inversely proportional to the decay rate of cavity photon, and small effective volume ($V_{eff}$), determining the photon intensity inside the cavity 400.

Figure 9:
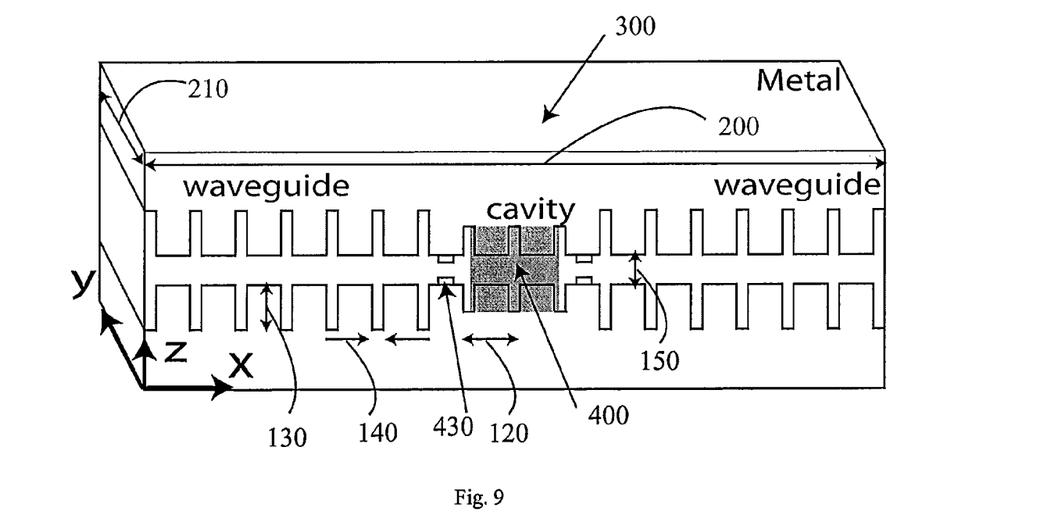
FIG. 9 illustrates the THz waveguide-cavity-waveguide with blocking structures.
Figure 10:
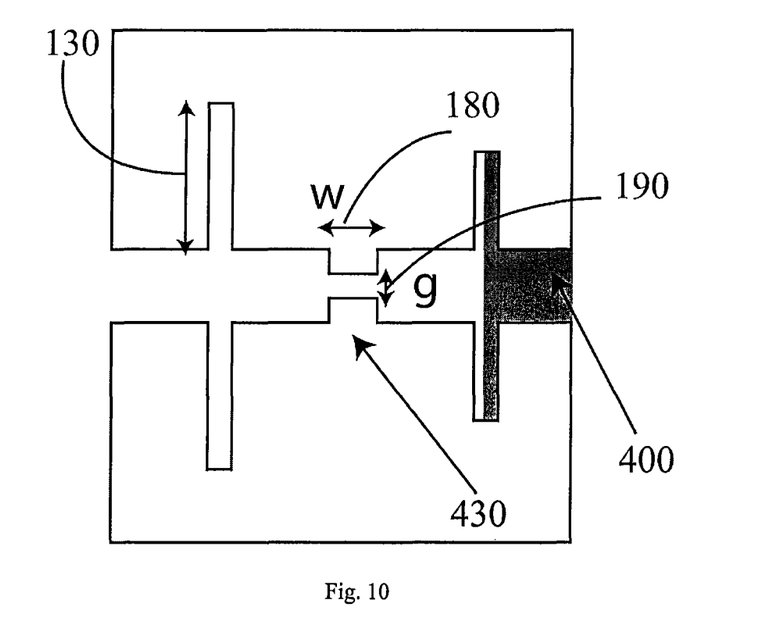
FIG. 10 shows blocking structures with geometrical parameters of w=0.2d and g=d/3, d/6 and d/12, respectively.

First, high Q is needed to decrease $\Gamma_c$ 480 and increase switching functionality at small δn/n. For example, we can design the cavity structure 400 by placing blocking structures 430 as shown in FIG. 9. The detail blocking structures 430 with w 180 and g 190 are illustrated in FIG. 10.

FDTD calculation shows that Q increases corresponding to the size of blocking structures 430 because the increased potential barriers of the cavity 400 allow small energy leakage from the cavity 400 to waveguides 410.

Figure 11:
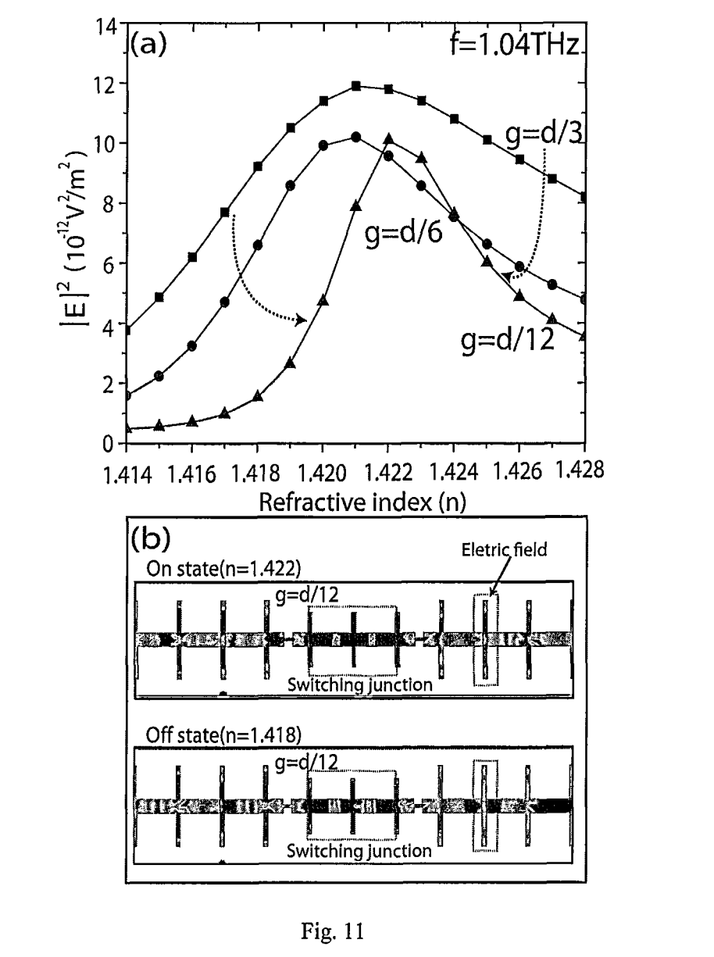
FIG. 11(a) shows the magnitude of the E-field of f=1.04 THz in a metallic groove located at 800 μm corresponding to the refractive index modulation inside the switching junction. THz waveguides and cavity have same geometrical parameters as shown in the FIG. 10. Blocking structures have geometrical parameters of w=0.2d and g=d/3, d/6 and d/12, respectively.
FIG. 11(b) shows spatial snapshots of E-field shows ON state (n=1.422) and OFF state (n=1.418), respectively.
Figure 12:
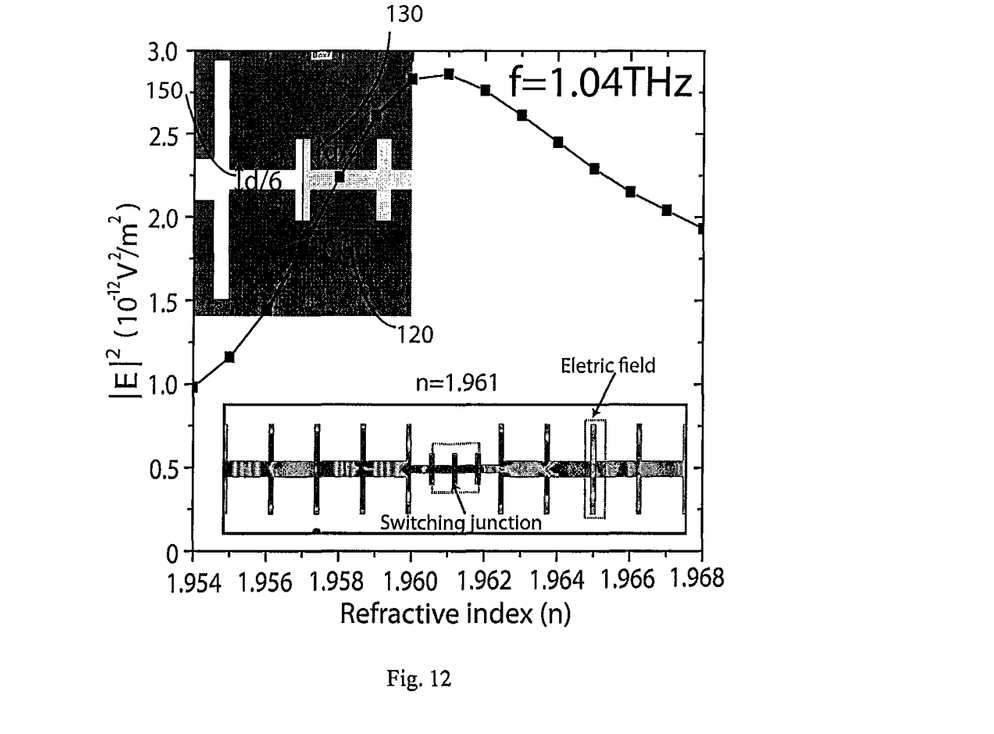
FIG. 12 shows the magnitude of an E-field of f=1.04 THz in a metallic groove located at 800 µm corresponding to the refractive index modulation inside the switching junction. THz waveguides have the same geometrical parameters shown in FIG. 4. In addition, the cavity has geometrical parameters of d=50 µm, a=10 µm, h=25 µm, and t=100/6 µm=16.67 µm.

Thus, switching functionality can be elevated if we construct high Q cavity structures 400 as shown in FIG. 11(a). For example, ON-OFF functionality of the switch with blocking structure 430 (w 180=0.2d and g 190=d/12) can be easily achieved at δn=0.004 as provided in FIG. 11(b), thereby yielding the 3-dB extinction ratio at δn/n~0.002. Even though high Q is desirable for ON-OFF switching function, it is necessary to consider resonant matching issue ($\omega=\omega_a=\omega_o$) because of small bandwidth of THz waveguides 410 and cavity 400.

However, the intrinsic losses in the metal affect the Q factors in the cavity, thus limiting the switching performance. For example, we use Ag properties with a conductivity of σ=6.1×10$^7$ Ω$^{-1}$m$^{-1}$. Furthermore, the 3-dB switching extinction ratio of a switch with Ag blocking structures 430 of w 180=0.2d and g 190=d/12 can be achieved at a δn/n of ~0.007 through FEM simulation.

As an alternative method, we can increase the energy accumulation ($\Delta\omega_o$) inside the cavity 400 if we decrease the size of the switching junction ($V_{eff}$) as shown in inset of FIG. 10. As expected, the switching junction with small dimension (height 130: d/4, thickness 150: d/6 and periodic distance 120: d/2) requires the large refractive index 110 (n=1.961) for the resonant frequency 350 of the switching junction. Even though size reduction induces small propagation length at ON state because of large potential barriers between cavity 400 and waveguides 410, this structure allows to obtain 3-dB extinction ratio at δn/n~0.0025, thus demonstrating the usefulness of energy accumulation of the switching functionality.

THz Switching Based on Absorption

As a different approach, absorption modulation can be considered a new method for THz signal control and routing. To verify loss induced THz switching, let us now turn to the case of purely absorptive modulation, in which the input field frequency ω coincides with both the cavity resonance, $\omega_o$ 350, and specific frequency, $\omega_a$ 360, of the waveguides. Thus, TCWA gives $$T(\omega) = \frac{(\Gamma_c)^2}{(\Gamma_c + \Gamma_o)^2} \text{ and } R(\omega) = \frac{(\Gamma_o)^2}{(\Gamma_c + \Gamma_o)^2} \quad (3)$$

The only dependent parameters for determining transmission and reflection are $\Gamma_o$ 470 and $\Gamma_c$ 480. More specifically, we consider two fundamental limiting cases: In the first case, $\Gamma_o$ 470 $\ll \Gamma_c$ 480, the switching state is ON. In the second case, $\Gamma_o$ 470 $\ll \Gamma_c$ 480, the switching state is OFF. As such, we assume that $\Gamma_o$ 470 only depends on the extinction coefficient α of the dielectric material inside the cavity. Hence, $\Gamma_o$ can be approximately given by a $\Gamma_o$ 470 of ~2ωα/n with a dielectric material permittivity of $\in=(n+j\alpha)^2$. At a resonant frequency $\omega_o$ 350 of ~1.38πc/2d, where n=1.421 and α=0.01, the intrinsic cavity decay rate is almost equal to a $\Gamma_o$ 470 of ~0.0194πc/2d, which means $\Gamma_o$ 470$\gg\Gamma_c$ 480 (Q of ~690, $\Gamma_c$ 470=0.001015πc/2d), and thus T(ω) is ~0 and R(ω) is ~1, as provided in Eqn. (3).

Figure 13:
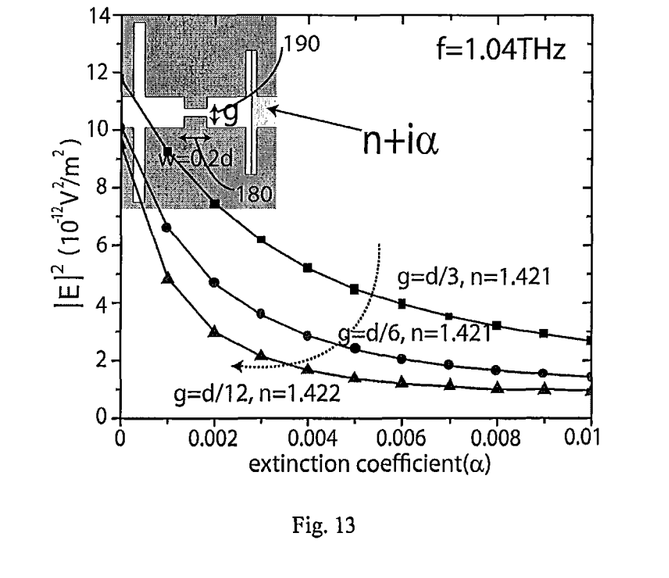
FIG. 13 shows the magnitude of the E-field of f=1.04 THz in a metallic groove located at 800 µm corresponding to the extinction coefficient α inside the switching junction. All geometrical configurations are the same as those in FIG. 11.

The FEM simulation validates THz switching using the loss-induced method. As illustrated in FIG. 13, the inherent loss-free systems yield an ON state from a resonant matching condition of $\omega=\omega_a$ 360=$\omega_o$ 350. On the other hand, as α increases, the output power is significantly reduced, as expected from Eqn. (3). Similar to the resonance modulation, a high Q factor is useful for obtaining a switching function at a small $\delta\alpha$ value. For example, a switch with blocking structures of w 180=0.2d and g 190=d/12 allows us to obtain a 3-dB extinction ratio at a $\delta\alpha$ of ~0.0015.

Fluctuations of Geometrical or Material Parameters

However, the performance of SSPP devices is highly robust against fluctuations in geometrical or material parameters due to a sub-wavelength tunneling mechanism t 150 of ~$\lambda$/9. Also, we note that even though a high Q factor is desirable for an ON-OFF switching function, it is essential to consider resonant matching issues ($\omega=\omega_a$ 360=$\omega_o$ 350) resulting from a small bandwidth.

Promising Applications

As all-optical THz switching, periodic gap structures can be used to enhance nonlinear optical effects. For instance, typical nonlinear optical behaviors can be occurred using a Kerr nonlinear media where the variation of the refractive index n 110 is altered by time-averaged field intensity. Thus, it is necessary to obtain high intensity low group velocity to increase nonlinear optical effects. Therefore, periodic corrugated metallic gap structures with high quality factor Q and small effective volume $V_{eff}$ are ideal environments for all-optical controlled switches based on nonlinear optics.

New THz biosensor architectures can be achieved by using the sub-wavelength topology engineering. Strong field localization enabled by sub-wavelength cavities 400 provides the resonant frequency modulation at the small refractive index modulation n 110, thus allowing us to build highly sensitive sensors, detectors and signal transducers.

Having described the invention regarding several preferred embodiments thereof, various modification, omission and addition will now certainly suggest itself to those skilled in the art. Thus, the invention is not to be limited to the disclosed embodiments other than as needed by the appended claims.

What is claimed is:

1. A dynamic switch for controlling propagation of a terahertz signal comprising:
   (a) a double-corrugated metallic waveguide having a number of uniform sized periodic grooves located on two opposite surfaces of the waveguide where the height, the width, and the periodicity of grooves as well as the distance between the opposite grooves are of sub-wavelength dimensions and the waveguide includes isotropic dielectric material inside its metallic outer surfaces;
   (b) a cavity that is a small intervening space between a first double-corrugated metallic waveguide segment and a second double-corrugated metallic waveguide segment where the said space contains a fewer number of double-sided grooves having height shorter than the height of grooves inside the double-corrugated metallic waveguide segment, and the cavity includes a different dielectric material from the isotropic dielectric inside of the double-corrugated metallic waveguide; and
   (c) the double-corrugated metallic waveguides on the two ends that provide the input of said dynamic switch and the output of said dynamic switch.

2. The terahertz switch of claim 1 wherein the metallic cavity having small space with grooves of smaller size, the cavity including two narrow constrictions whose guiding ratio can be adjust to tune the spectral selectivity, the cavity including a first double-corrugated metallic waveguide segments and a second double-corrugated metallic waveguide segment.

3. The dielectric inside the cavity in claim 1 is a non-linear dielectric material whose refractive index changes optically, electro-optically, or magnetically to control the On/Off state of the dynamic switch.

4. A dynamic switch for controlling propagation of a terahertz signal comprising:
   (a) a double-corrugated metallic waveguide having a number of uniform sized periodic grooves located on two opposite surfaces of the waveguide where the height, the width, and the periodicity of grooves as well as the distance between the opposite grooves are of sub-wavelength dimensions and the waveguide includes isotropic dielectric material inside its metallic outer surfaces;
   (b) a cavity that is a small intervening space between a first double-corrugated metallic waveguide segment and a second double-corrugated metallic waveguide segment where the said space contains no grooves, and the cavity includes a different dielectric material from the isotropic dielectric inside of the double-corrugated metallic waveguide; and
   (c) the double-corrugated metallic waveguides on the two ends that provide the input of said dynamic switch and the output of said dynamic switch.

5. A method of forming an optimal THz SSPP dynamic switch by:
   (a) using resonant modes of the sub-wavelength metallic cavity in order to characterize the On/Off switching of slow EM waves so that control is provided for propagation of EM waves over the input and the output ends of the said dynamic switch; and
   (b) providing slow EM wave propagation along double-sided corrugated metallic waveguides having uniform sized grooves of sub-wavelength dimensions.

6. The method of claim 5, wherein the said cavity provides resonant modes with resonant frequency $\omega_o$ and quality factor Q, which enables electromagnetic waves to pass from the input end to the output end.

7. The method of claim 5, wherein switching of binary states (On and Off) is obtained by resonance modulation of said cavity by changing the refractive index of the dielectric materials inside the cavity.

8. The method of claim 5, wherein switching of binary states (On and Off) is obtained by absorption modulation of said cavity by changing the extinction coefficient of the dielectric materials inside the cavity.

9. The method of claim 5, wherein optimal switching is applied to bio-sensing devices.

10. The method of claim 5, wherein optimal switching is applied to construct THz components such as multiplexer, demultiplexer, decoder, interferometer and nonlinear switches.

* * * * *